United States Patent
Martin et al.

(10) Patent No.: US 7,230,984 B2
(45) Date of Patent: Jun. 12, 2007

(54) METHODS AND SYSTEM FOR EQUALIZING DATA IN MULTICARRIER RECEIVER SYSTEMS

(75) Inventors: Richard K. Martin, Ithaca, NY (US); Jaiganesh Balakrishnan, Dallas, TX (US); Wonzoo Chung, Ithaca, NY (US); C. Richard Johnson, Jr., Newfield, NY (US); William A. Sethares, Madison, WI (US)

(73) Assignee: Cornell Research Foundation, Inc., Ithaca, NY (US)

( * ) Notice: Subject to any disclaimer, the term of this patent is extended or adjusted under 35 U.S.C. 154(b) by 762 days.

(21) Appl. No.: 10/390,390

(22) Filed: Mar. 17, 2003

(65) Prior Publication Data

US 2003/0210743 A1    Nov. 13, 2003

Related U.S. Application Data

(60) Provisional application No. 60/365,299, filed on Mar. 18, 2002.

(51) Int. Cl.
*H03H 7/30* (2006.01)
*H03H 7/40* (2006.01)
*H03K 5/159* (2006.01)

(52) U.S. Cl. .............. 375/232; 375/233; 375/346; 375/260; 375/285; 375/367; 455/63.1; 455/296

(58) Field of Classification Search ........... 375/232, 375/233, 346, 260, 285
See application file for complete search history.

(56) References Cited

U.S. PATENT DOCUMENTS

| | | | |
|---|---|---|---|
| 5,285,474 A | 2/1994 | Chow et al. | 375/13 |
| 5,650,954 A | 7/1997 | Minuhin | 364/825 |
| 5,673,290 A | 9/1997 | Cioffi | 375/260 |
| 6,320,902 B1 | 11/2001 | Nafie et al. | 375/228 |
| 6,370,190 B1 | 4/2002 | Young et al. | 375/233 |
| 7,031,410 B1 * | 4/2006 | Schenk et al. | 375/346 |
| 2001/0043651 A1 * | 11/2001 | Nishimura et al. | 375/232 |
| 2003/0012274 A1 * | 1/2003 | Markman et al. | 375/232 |

OTHER PUBLICATIONS

M. de Courville, P. Duhamel, P. Madec, and J. Palicot, "Blind equalization of OFDM systems based on the minimization of a quadratic criterion," in *Proceedings of the Int. Conf. on Communications*, Dallas, TX, Jun. 1996, pp. 1318-1321.

(Continued)

*Primary Examiner*—David C. Payne
*Assistant Examiner*—Jia Lu
(74) *Attorney, Agent, or Firm*—Burns & Levinson LLP; Jacob N. Erlich; Orlando Lopez

(57) ABSTRACT

A method for equalizing data and systems utilizing the method. The method of this invention for equalizing (by shortening the channel response) data includes minimizing a function of the data and a number of equalizer characteristic parameters, where the function utilizes cyclic differences of equalized data. Updated equalizer characteristic parameters are then obtained from the minimization and an initial set of equalizer characteristic parameters. Finally, the received data is processed utilizing the equalizer defined by the minimization. The method of this invention can be implemented in an equalizer and the equalizer of this invention may be included in a system for receiving data.

17 Claims, 7 Drawing Sheets

OTHER PUBLICATIONS

R.K. Martin, J. Balakrishnan, W.A. Sethares, and C.R. Johnson Jr., "A Blind, Adaptive TEQ for Multicarrier Systems," IEEE Signal Processing Letters, vol. 9, No. 11, pp. 341-343, Nov. 2002.

P. P. Vaidyanathan and B. Vrcelj, "Fast and Robust Blind-Equalization Based on Cyclic Prefix," in *Proc. IEEE Int. Conf. on Comm.*, New York, NY, Apr.-May 2002, vol. 1, pp. 1-5.

K. Sistanizadeh, *"Loss characteristics of the proposed canonical ADSL loops with 100-Ohm termination at 70, 90, and 120 F,"* ANSI T1E1.4 Committee Contribution, No. 161, http://www.ece.utexas.edu/~bevans/projects/adsl/dmtteq/dmtteq.html.

P. J. W. Melsa, R. C. Younce, and C. E. Rohrs, "Impulse Response Shortening for Discrete Multitone Transceivers," *IEEE Trans. on Comm.*, vol. 44, pp. 1662-1672, Dec. 1996.

U.S. Appl. No. 60/365,299, filed Mar. 18, 2002. Title: Blind, Adaptive Channel Shortening for Multicarrier Receiver Systems. Applicants: Richard K. Martin, et al.

\* cited by examiner

METHODS AND SYSTEM FOR EQUALIZING DATA IN MULTICARRIER RECEIVER SYSTEMS

CROSS REFERENCE TO RELATED APPLICATIONS

This application claims priority of U.S. Provisional Application 60/365,299, "Blind, Adaptive Channel Shortening for Multicarrier Receiver Systems", filed on Mar. 18, 2002, which is incorporated by reference herein.

STATEMENT REGARDING FEDERALLY SPONSORED RESEARCH OR DEVELOPMENT

This invention was made partially with U.S. Government support from the National Science Foundation under Contract No. ECS-9811297. The U.S. Government has certain rights in the invention.

BACKGROUND OF THE INVENTION

This invention relates generally to data communications and, more particularly, to methods and systems for time domain equalization of data signals received from a data communications channel and for channel shortening.

Channel shortening can be thought of as a generalization of equalization, since equalization amounts to shortening the channel to length 1. Channel shortening was first utilized in an optimal estimation method that minimizes the error probability of a sequence, maximum likelihood sequence estimation (MLSE).

A form of channel shortening can also be utilized in multiuser detection. For a flat-fading DS-CDMA system with L users, the optimum multiuser detector is the MLSE detector; yet, complexity grows exponentially with the number of users. "Channel shortening" can be implemented to suppress L–K of the scalar channels and retain the other K channels, effectively reducing the number of users from L to K.

Channel shortening has recently seen a revival due to its use in multicarrier modulation (MCM). MCM techniques such as orthogonal frequency division multiplexing (OFDM) and discrete multi-tone (DMT) have been deployed in applications ranging from the wireless LAN -standards IEEE 802.11a and HIPERLAN/2, Digital Audio Broadcast (DAB) and Digital Video Broadcast (DVB) in Europe, to asymmetric and very-high-speed digital subscriber loops (ADSL, VDSL).

In one example of a multicarrier system, before transmission, the available bandwidth is divided into parallel sub-bands(tones). The incoming data is distributed among all the available tones and used to modulate each tone. An Inverse Fast Fourier Transform operation converts the modulated tones into a time domain signal. Before entering the transmission channel, a cyclic prefix is added to the time sequence.

One reason for the popularity of MCM is the ease with which MCM can combat channel dispersion, provided the channel delay spread is not greater than the length of the cyclic prefix (CP). However, if the CP is not long enough, the orthogonality of the sub-carriers is lost and this causes both inter-carrier interference (ICI) and inter-symbol interference (ISI).

A technique for ameliorating the impact of an inadequate CP length is the use of a time-domain equalizer (TEQ) in the receiver. The TEQ is a filter that shortens the effective channel (by shortening the channel impulse response) to the length of the CP.

Since transmission channels and noise statistics can change during operation, it is desirable to design an equalizer that changes when the receiver or received data changes. Such an equalizer is described as an adaptive equalizer. An adaptive equalizer design method is given in U.S. Pat. No. 5,285,474 (issued on Feb. 4, 1994 to J. Chow et al.). However, the algorithm of U.S. Pat. No. 5,285,474 requires training data and a local replica of the training data. Similarly, the time domain equalizer described in U.S. Pat. No. 6,320,902 (issued on Nov. 20, 2001 to M. Nafie et al.) also requires training data and also requires a Fast Fourier Transform and followed by an Inverse Fast Fourier Transform.

It is also desirable to design an adaptive equalizer that does not require training data or identification of the channel. Such equalizers are described as blind adaptive equalizers. De Courville, et al. have proposed a blind, adaptive TEQ (M. de Courville, P. Duhamel, P. Madec, and J. Palicot, "Blind equalization of OFDM systems based on the minimization of a quadratic criterion," in *Proceedings of the Int. Conf. on Communications*, Dallas, Tex., June 1996, pp. 1318–1321.) that relies on the presence of unused subcarriers within the transmission bandwidth. However, the method described by de Courville performs complete equalization rather than channel shortening and considered systems without a cyclic prefix. Since it is desired to perform channel shortening, the overall performance of an equalizer that that performs complete equalization is expected to be worse.

There is a need for a blind adaptive equalizer designed for channel shortening.

It is therefore an object of this invention to provide methods for the design of a blind adaptive equalizer for channel shortening.

It is a further object of this invention to provide a blind adaptive equalizer for channel shortening.

SUMMARY OF THE INVENTION

The objects set forth above as well as further and other objects and advantages of the present invention are achieved by the embodiments of the invention described hereinbelow.

A method for obtaining and updating the coefficients of blind, adaptive channel shortening time domain equalizer for application in a data transmission system is disclosed.

The method of this invention for equalizing (by shortening the channel response) data includes minimizing a function of the data and a number of equalizer characteristic parameters, where the function utilizes cyclic differences of equalized data. The equalizer characteristic parameters are then obtained from the minimization and an initial set of equalizer characteristic parameters. Finally, the data is processed utilizing the equalizer defined by the minimization.

The method of this invention can be implemented in an equalizer and the equalizer of this invention may be included in a system for receiving data from a transmission channel.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

A method for obtaining and updating the coefficients of blind, adaptive channel shortening time domain equalizer for application in a data transmission system and equalizers obtained by that method are disclosed hereinbelow.

Figure 1:
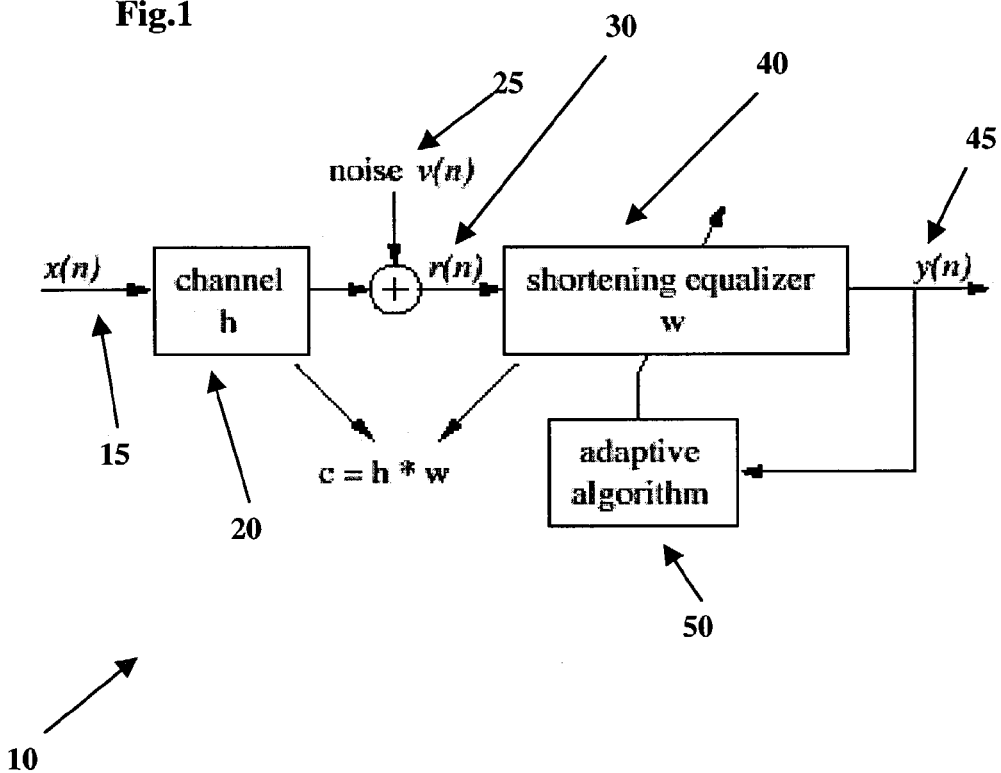
FIG. 1 is a graphical and block representation of an embodiment of a receiving section of a data transmission system utilizing an equalizer of this invention.

FIG. 1 depicts a block representation of an embodiment of a receiving section 10 of a data transmission system including an equalizer 40 of this invention. Referring to FIG. 1, the received sequence r(n) 30 is generated by passing the transmitted data x(n) 15 through a channel h 20 and adding samples of the noise v(n) 25. The impulse response of the channel 20 is represented by a sequence $h(0),h(1) \ldots h(L_h)$ of length $L_h+1$ (length as used herein refers to the number of samples in the sequence; if the samples are taken at preselected time intervals, the length would correspond to the duration of the response). The impulse response of the equalizer 40 is represented by a sequence $w(0),w(1) \ldots w(L_w)$ of length $L_w+1$. The received sequence r(n) 30 is given by the following expression, $$r(n) = \sum_{k=0}^{L_h} h(k)x(n-k) + v(n)$$

The output sequence y(n) 45 is given by $$y(n) = \sum_{k=0}^{L_w} w(k)r(n-k)$$

or, in vector notation $$y(n) = w^T r_n$$

where $w^T$ is the transposed vector $[w(0)w(1) \ldots w(L_w)]$ and $r_n$ is the vector $[r(n)r(n-1) \ldots r(n-L_w)]^T$. In the absence of noise, the system impulse response, c, is given by the convolution of the channel impulse response, h, and the equalizer impulse response, w, $$c = h * w = \sum_{k=0}^{L_w} w(k)h(n-k)$$

where c is of length $L_h+L_w+1$.

Figure 2:
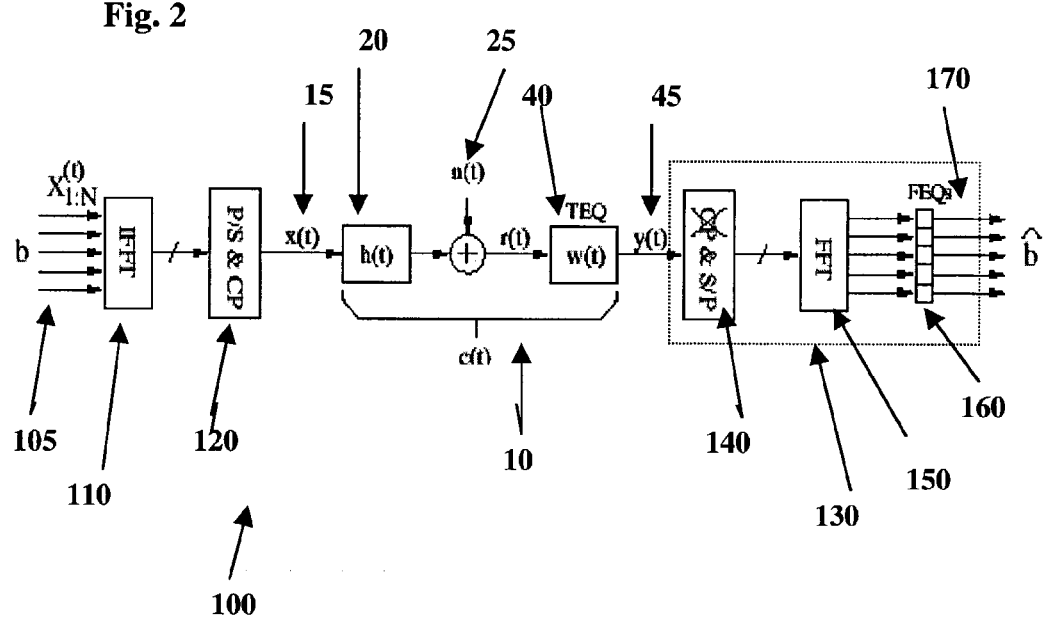
FIG. 2 is a graphical and block representation of an embodiment of a data transmission system utilizing an equalizer of this invention.

FIG. 2 depicts a graphical and block representation of an embodiment of a multi-carrier data transmission system utilizing an equalizer of this invention.

Referring to FIG. 2, in a multi-carrier modulation system 100, a block of N samples of input data 105 is Inverse Fast Fourier Transformed (IFFT) by an IFFT component 110 and converted from parallel to serial and a cyclic prefix (CP) added 120. The cyclic prefix is obtained by pre-appending the last v samples of each block to the beginning of the block. If the CP is at least as long as the channel impulse response, then the transmitted data can then be equalized, after being Fast Fourier Transformed (FFT) by an FFT component 150, by a bank of complex gains, referred to as a frequency domain equalizer (FEQ) 160.

However, transmitting the cyclic prefix (CP) wastes time slots that could be used to transmit data. Thus, the CP is usually set to a reasonably small value, and the equalizer of this invention (TEQ) 40 is employed to shorten the channel to this length.

After the CP is added, the last v samples of the transmitted data, x(t), 15 are identical to the first v samples in a block of length M=N+v, that is, $$x(Mk+i)=x(Mk+i+N), i\in\{1, \ldots, v\}$$

The channel destroys the above relationship, because the interchannel interference (ICI) and the inter-symbol interference (ISI) that affect the CP are different from the ICI & ISI that affect the last v samples in the transmitted data. Consider a system with N=8, v=2, and h=[h(0), ... ,h(4)]. The CP contains x(1),x(2) and the data block contains x(3), ... ,x(10). Note that x(2)=x(10), but at the receiver, the interfering samples before sample 2 are not all equal to their counterparts before sample 10. If h(2),h(3),h(4) were zero, then r(2)=r(10). If the channel order L<v, then the last sample in the CP should match the last sample in the data block.

A cost function indicative of the error caused by ISI and the ICI is, as suggested by the above example, $$J=E[|y(v+\Delta)-y(v+N+\Delta)|], \text{ where } \Delta\in\{0, \ldots M-1\}$$

is the symbol synchronization parameter which is included because knowledge of where the symbol begins is required for evaluation of the cost function. The choice of $\Delta$ will change the cost function. The functional form $y(i+\Delta)-y(i+N+\Delta)$ is hereinafter referred to as a cyclic difference.

Figure 3:
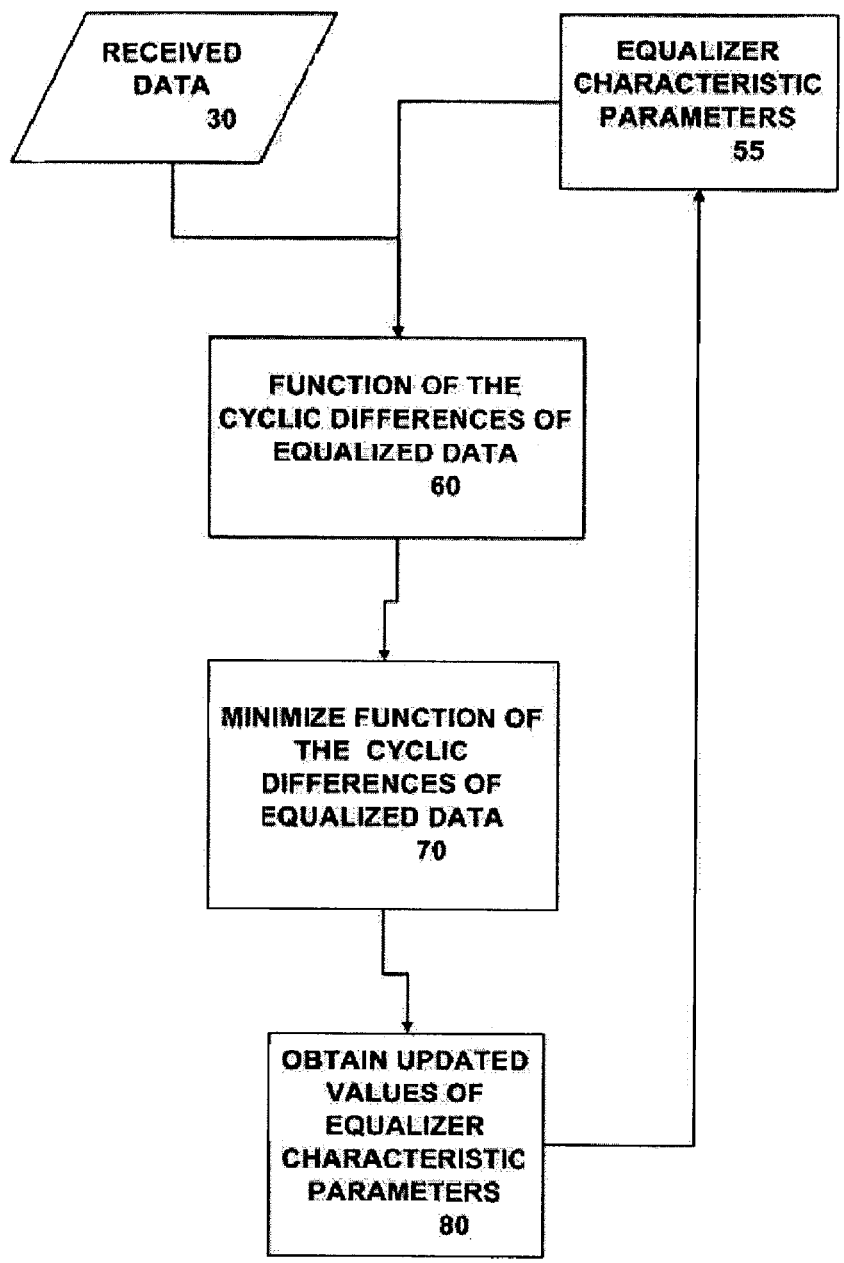
FIG. 3 is a block diagram representation of an embodiment of the method of this invention.

FIG. 3 is a block diagram of an embodiment of the method of this invention for obtaining values of the equalizer characteristic parameters. In one embodiment, the equalizer characteristic parameters are the values of the equalizer impulse response. For a specific equalizer design, such as a transversal filter equalizer, the equalizer characteristic parameters are the design parameters of that specific equalizer design. Referring to FIG. 3, a function of the cyclic differences of the equalized data (step 60, FIG. 3), is obtained in terms of the received data, r(n) (30, FIG. 1), and the equalizer characteristic parameters or the impulse response of the equalizer (40, FIG. 1). (The equalized data is the output sequence y(n) 45, FIG. 1.) The function is minimized (step 70, FIG. 3) and the minimization yields values of the equalizer characteristic parameters (step 80, FIG. 3). The received data, r(n) (30, FIG. 1), is processed utilizing the equalizer 40 incorporating the values of the equalizer characteristic parameters obtained from minimization.

In one embodiment, a generalized function of the cyclic differences of the equalized data is given by $$J_1 = \sum_{i \in S_f} E[|y(Mk+i+\Delta) - y(Mk+i+N+\Delta)|^2]$$

where $\Delta \in \{0, \ldots M-1\}$ and $S_f \subset \{1, \ldots, v\}$ is an index set.

The time domain equalizer optimization problem, in the above embodiment, can then be stated as obtaining the sequence $w(0), w(1) \ldots w(L_w)$ of length $L_w+1$ that minimizes $J_1$ subject to periodic renormalization (the renormalization can be expressed as requiring $\|w\|=1$, also expressed as, $$w(k+1) = \frac{\hat{w}(k+1)}{\|\hat{w}(k+1)\|} \Bigg).$$

Referring to FIG. 3, in the above embodiment, the function $J_1$ is minimized (step 70, FIG. 3) and the minimization yields updated values of the equalizer characteristic parameters (step 80, FIG. 3). The initial update of the values of the equalizer characteristic parameters requires initial values for the equalizer characteristic parameters. Subsequent updates update the previously obtained values of the equalizer characteristic parameters.

The steepest gradient-descent algorithm over the hypersurface defined by the cost function $J_1$ is, for symbol k=0,1,2, . . . , $$\tilde{r}_i(k) = (r(Mk+i+\Delta) - r(Mk+i+N+\Delta))$$
$$e_i(k) = w^T \tilde{r}_i(k)$$
$$\hat{w}(k+1) = w(k) - \mu \sum_{i \in S_f} e_i(k) \tilde{r}_i^*(k)$$
$$w(k+1) = \frac{\hat{w}(k+1)}{\|\hat{w}(k+1)\|}$$

where $r(i) = [r(i), r(i-1), \ldots r(i-L_w)]^T$, $w(k)$ is the vector of the impulse response of the equalizer and * denotes complex conjugation and $\mu$ denotes the step size.

The cost function, $J_1$, of the first embodiment, under non-stringent conditions usually satisfied by practical systems (see U.S. Provisional Application 60/365,299), can be expressed as $$J_1 = 2\sigma_x^2 \sum_{i \in S_f} \left[ \left( \sum_{j=0}^{\Delta+i-v-1} |c_j|^2 + \sum_{j=i+\Delta}^{L_c} |c_j|^2 \right) + 2w^T R_n w^* \right],$$

where $\sigma_x^2$ is the variance of the data and $R_n$ is given by $E[n_i n_i^H]$.

(In the configuration in which zeros are transmitted during the period in which the CP is normally transmitted, the above expression could contain an additional term.) The above function includes a function of the components of the system impulse response, $c_j$.

In a second embodiment, the set $S_f$ consists of only one element, that is $S_f = \{v\}$. In the second embodiment, the difference between the last sample in the CP and the last sample in the data block is minimized, resulting in a cost function given by $J_2 = E[|y(Mk+v+\Delta) - y(Mk+v+N+\Delta)|^2]$ where $\Delta \in \{0, \ldots M-1\}$.

In the second embodiment, the algorithm can be expressed as $$\tilde{r}(k) = (r(Mk+v+\Delta) - r(Mk+v+N+\Delta))$$
$$e(k) = w^T \tilde{r}(k)$$
$$\hat{w}(k+1) = w(k) - \mu e(k) \tilde{r}^*(k)$$
$$w(k+1) = \frac{\hat{w}(k+1)}{\|\hat{w}(k+1)\|}$$

Since y(k) is given by $y(k) = w^T r_k$, the above algorithm can be expressed in terms of y(k).

The cost function, $J_2$, of the second embodiment, under non-stringent conditions usually satisfied by practical systems (see U.S. Provisional Application 60/365,299 and R. K. Martin, J. Balakrishnan, W. A. Sethares, and C. R. Johnson Jr., "A Blind, Adaptive TEQ for Multicarrier Systems," IEEE Signal Processing Letters, vol. 9, no. 11, pp. 341–343, November 2002, which is hereby incorporated by reference) can be expressed as $$J_2 = 2\sigma_x^2 \left( \sum_{j=0}^{\Delta-1} |c_j|^2 + \sum_{j=v+\Delta}^{L_c} |c_j|^2 \right) + 2w^T R_n w^*$$

The time domain equalizer of this invention may be utilized, for example, but not limited to, in multi-carrier modulation systems, such as ADSL systems, in block based data communication systems (such as, but not limited to, the system described in P. P. Vaidyanathan and B. Vrcelj, "Fast and Robust Blind-Equalization Based on Cyclic Prefix," in *Proc. IEEE Int. Conf. on Comm.*, New York, N.Y., April–May 2002, vol. 1, pp. 1–5.), and also in non-CP based (non-cyclic prefix based) systems such as transmitter zero (TZ) OFDM systems.

Referring again to FIG. 2, in a multi-carrier modulation system 100, input data 105 is Inverse Fast Fourier Transformed (IFFT) by an IFFT component 110 and converted from parallel to serial and a cyclic prefix (CP) added 120. The transmitted data x(t) 15 is transmitted through the channel h 20 and the noise v(t) 25 added. The transmitted data and the added noise, r(t) 30, constitutes the input to the receiver 170. The receiver 170 includes an equalizer 40 of this invention and a demodulator 130. The equalizer 130 is described by a number of equalizer characteristic parameters.

For the first and second embodiments of the method of this invention for obtaining the equalizer characteristic parameters, an initial value for the equalizer characteristic parameters is provided. In one implementation, the initialization is given by 0,0,0, . . . 1, . . . , 0,0,0, where the non-zero ("1") value occurs at the mid-point of the weight value sequence (also referred to as a single spike initialization). For the embodiments of the methods of this invention, an updated or a calculated value for each one of the equalizer characteristic parameters is obtained by minimizing a function of the cyclic differences of the equalized data, y(t) 45, or a function derived from a function of the cyclic differences of the equalized data, y(t) 45.

The demodulator 130 includes a module 140 that receives the equalized data, y(t) 45, removes the cyclic prefix and converts the received data from serial to parallel, a Fast Fourier Transform (FFT) module that converts the time domain signal back to modulated tones. The modulated tones are equalized by a frequency-domain equalizer (FEQ), a bank of complex scalars. It should be noted that although the embodiment shown in FIG. 2 depicts an ADSL compatible system, such as that described in U.S. Pat. No. 5,673,290 (issued to Cioffi on Sep. 30, 1997), other embodiments are also within the scope of this invention.

The equalizer can be implemented in software, hardware or a combination of software and hardware. If implemented in software (or partially implemented in software), the receiver 170 may include one or more processors (not shown) and one or more computer readable memories (also not shown) containing instructions capable of causing the one or more processors to execute the method of this invention (described herein above).

Figure 4:
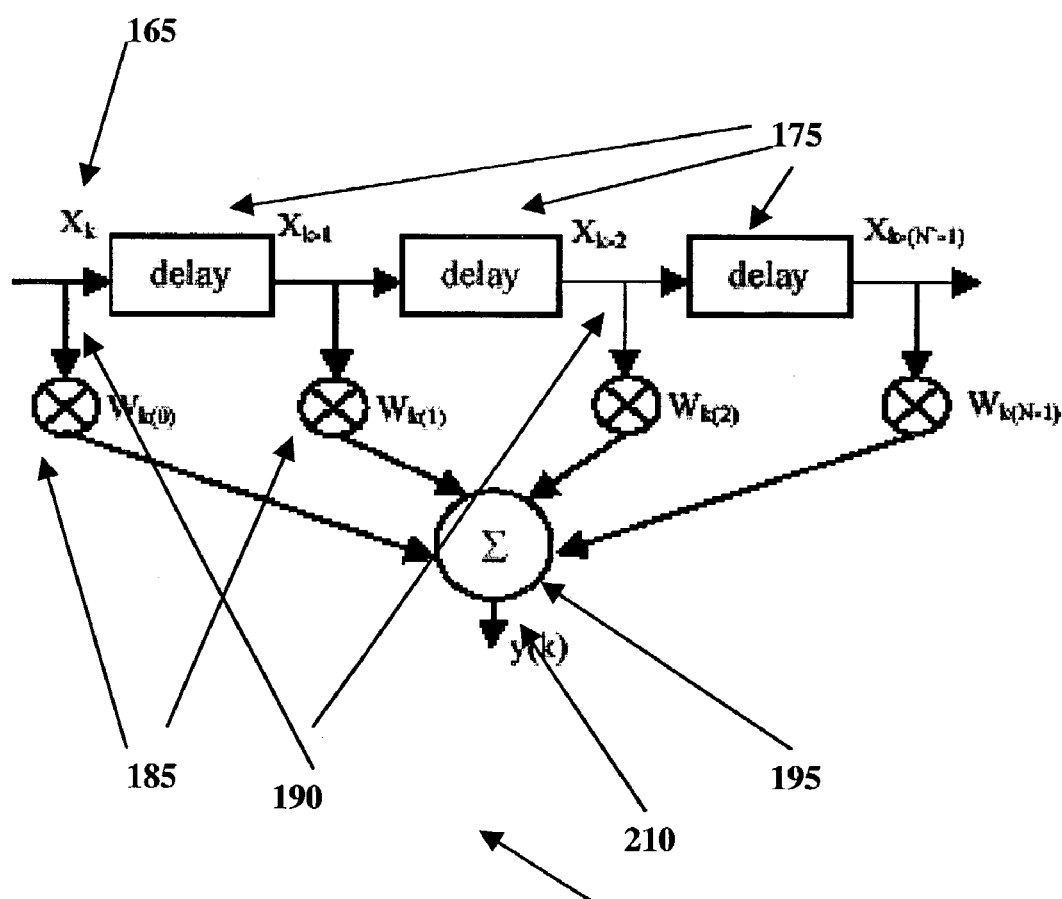
FIG. 4 depicts a block representation of an embodiment of an equalizer of this invention.

FIG. 4 depicts a block representation of an embodiment of an equalizer of this invention. Referring to FIG. 4, a transversal filter 180 implementation of the equalizer 40 of this invention includes a number of delay elements 175, a number of multiplying elements 185, and a summing element 195. During operation, each delay element 175 delays a datum from the received data x(k) 165, denoted by $x^k$, by a predetermined delay, which in the embodiment shown in FIG. 4 is one unit. The output 190 of each delay element is multiplied by a weight value $w_{k(0)}, w_{k(1)}, w_{k(2)}, \ldots, w_{k(N-1)}$.

In the first and second embodiments of the methods of this invention for updating the equalizer characteristic parameters, the weight values are initially set to an initial value $w_{0(0)}, w_{0(1)}, w_{0(2)}, \ldots, w_{0(N-1)}$. In one implementation, the initial values are 0,0,0, . . . 1, . . . , 0,0,0, where the non-zero ("1") value occurs at the mid-point of the weight value sequence. The weight values are updated according to the methods of the first or second embodiments of this invention. In the first embodiment, the weight values are updated according to $$\tilde{r}_i(k) = (r(Mk + i + \Delta) - r(Mk + i + N + \Delta))$$

$$e_i(k) = w^T \tilde{r}_i(k)$$

$$\hat{w}(k+1) = w(k) - \mu \sum_{i \in S_f} e_i(k) \tilde{r}_i^*(k)$$

$$w(k+1) = \frac{\hat{w}(k+1)}{\|\hat{w}(k+1)\|}$$

In the second embodiment, the weight values are updated according to $$\tilde{r}(k) = (r(Mk + v + \Delta) - r(Mk + v + N + \Delta))$$

$$e(k) = w^T \tilde{r}(k)$$

$$\hat{w}(k+1) = w(k) - \mu e(k) \tilde{r}^*(k)$$

$$w(k+1) = \frac{\hat{w}(k+1)}{\|\hat{w}(k+1)\|}$$

The transversal filter 180 implementation of the equalizer 40 includes means (not shown) for providing the weight values to the multipliers. If the equalizer is implemented in software (also referred to as computer readable code) such means are locations in a computer readable memory in which each weight value is stored and instructions for retrieving each updated or calculated weight value and providing to a multiplier unit. If the equalizer is implemented in hardware, such means can have various embodiments (see, for example, but not limited to, U.S. Pat. No. 6,370,190, issued on Apr. 9, 2002 to Young et al., and U.S. Pat. No. 5,650,954, issued on Jul. 22, 1997 to Minuhin, both of which are incorporated by reference herein).

Figure 5:
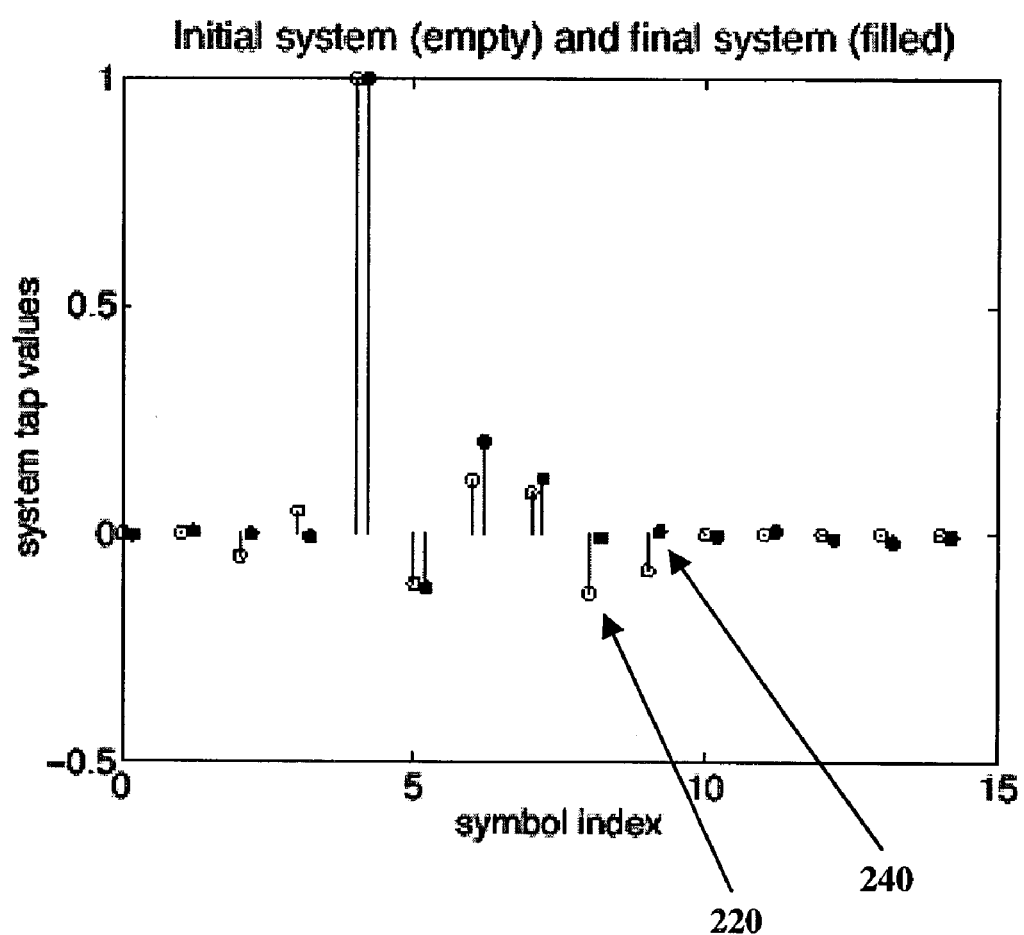
FIG. 5 is a graphical representation of results from applying one embodiment of the equalizer of this invention.

In order to even more clearly understand the methods of this invention, reference is now made to the following illustrative simulation examples. For the second embodiment of the methods of this invention for updating the equalizer characteristic parameters, simulations were performed for data communications channel similar to an ADSL channel, such as that shown in FIG. 2. The simulation utilizes an FFT size N=16, a channel with an impulse response of length 8, a CP length of v=4 (so the desired impulse response should have only 5 significant taps), an index set of $S_f=\{4\}$ (so the final impulse response is expected to have a width of 4 taps), an equalizer of length of 8, a step size μ of 0.01, and 30 dB SNR. FIG. 5 depicts the initial 220 and final 240 channel-equalizer impulse responses. The system impulse response has been shortened to 4 taps, as desired.

Also for the second embodiment of the methods of this invention for updating the equalizer characteristic parameters, simulations were performed utilizing an ADSL data communications channel as in FIG. 2. The cyclic prefix v used was 32; the FFT size was 512; the time domain equalizer had 16 taps; the channel was the CSA test loop 1 (see K. Sistanizadeh, "*Loss characteristics of the proposed canonical ADSL loops with* 100-*Ohm termination at* 70, 90, *and* 120 *F*," ANSI T1E1.4 Committee Contribution, no. 161, November 1991.). The channel data is available at http://www.ece.utexas.edu/~bevans/projects/adsl/dmtteq/dmtteq.html.

The noise power was set such that the power of the signal transmitted through the channel is 40 db above the noise power.

The time domain equalizer was initialized to a single spike; that is, the initial tap values of the 16 tap equalizer are [0, 0, 0, 0, 0, 0, 0, 1, 0, 0, 0, 0, 0, 0, 0, 0].

Figure 6:
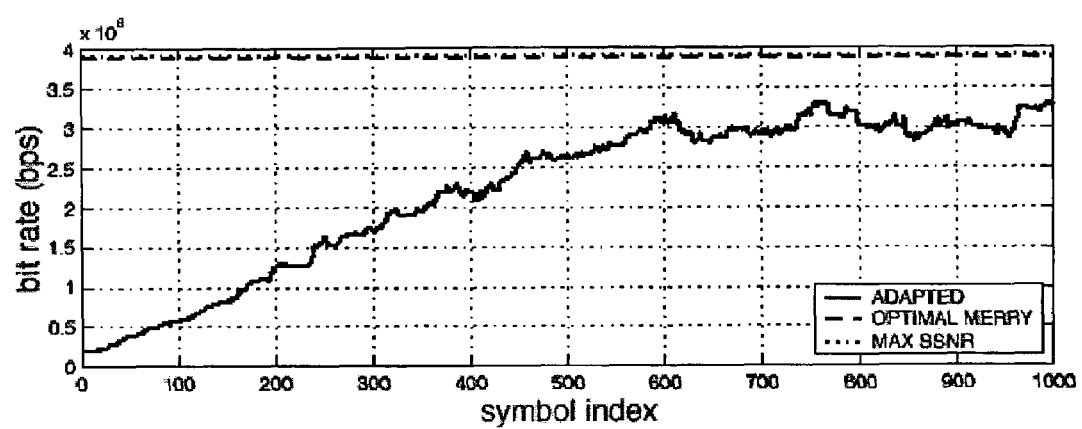
FIG. 6 is a graphical representation of results from applying another embodiment of the equalizer of this invention; and, FIG. 7 is another graphical representation of results from applying another embodiment of the equalizer of this invention.

The DSL performance metric is the achievable bit rate for a fixed probability of error, $$B = \sum_i ln_2\left(1 + \frac{SNR_i}{\Gamma}\right),$$

where $SNR_i$ is the signal to interference and noise ratio in frequency bin i. (A 6 dB margin and 4.2 dB coding gain are utilized.) FIG. 6 shows that the algorithm obtained from the second embodiment of the methods of this invention can rapidly provide a solution approaching the maximum SSNR solution (maximum shortened SNR non-blind solution described in P. J. W. Melsa, R. C. Younce, and C. E. Rohrs, "Impulse Response Shortening for Discrete Multitone Transceivers," *IEEE Trans. on Comm.*, vol. 44, pp. 1662–1672, December 1996) and the optimal solution corresponding to the algorithm obtained from the second embodiment of the methods of this invention. For DSL, the algorithm obtained from the second embodiment of the methods of this invention should converge within 1000 symbols (data items) in order to perform bit allocation at the end of the initialization period. Alternatively, in a broadcast environment, tracking speed is more of an issue than converging within a set time.

Figure 7:
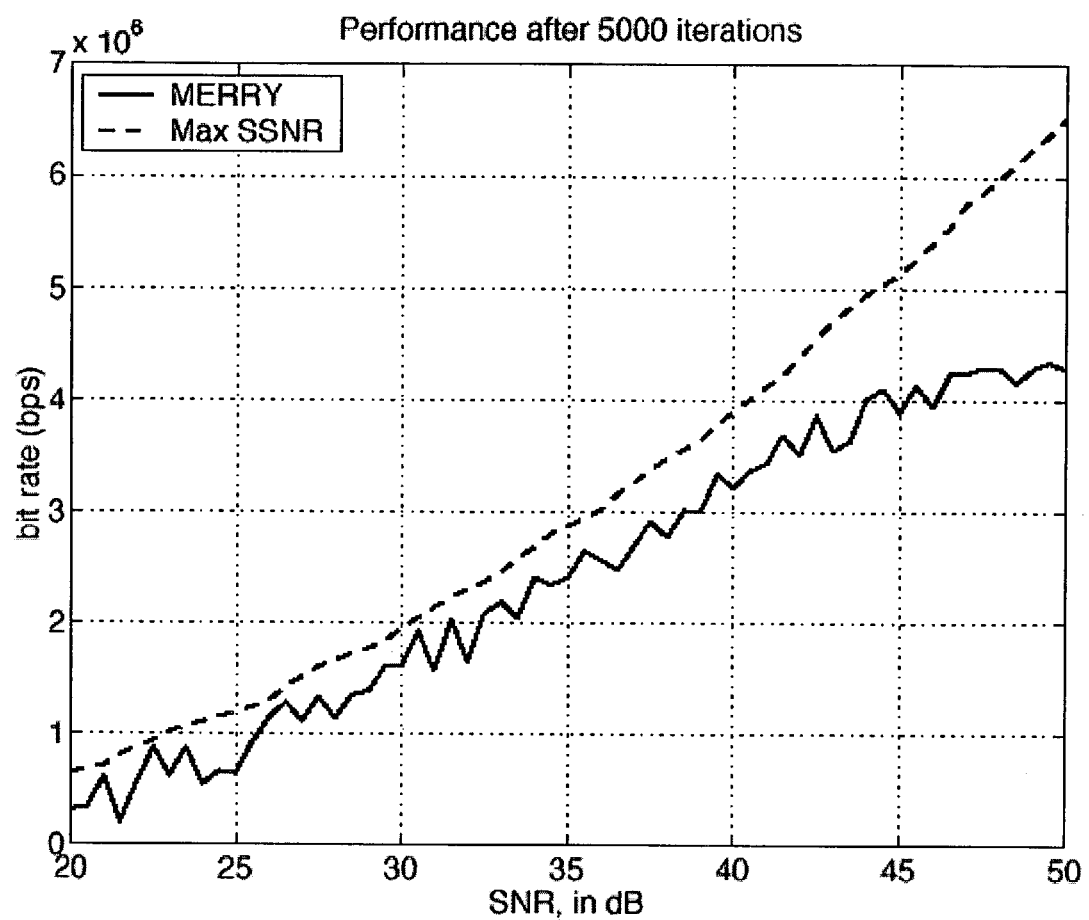

FIG. 7 depicts the bit rate vs. SNR obtained from the second embodiment of this invention for the above described conditions. For the results depicted in FIG. 7, the bit rate was computed performing the simulation for 5000 data items (symbols) and gradually decreasing the step size over time. For all the SNR values shown, the results from the algorithm obtained from the second embodiment of the methods of this invention approach the maximum SSNR solution. The jaggedness is due to the random input.

It should be noted that, although the example given refers to ADSL, the method and systems of this invention can be applied to a broad range of data communication channels. For example, this invention may be utilized, but not limited to, in multi-carrier modulation systems, such as ADSL systems, in block based data communication systems, and also in non-CP based (non-cyclic prefix based) systems.

It should be noted that although the equalizer representation embodiment shown is a transversal filter equalizer, other embodiments are within the scope of this invention.

Although an $L_2$ norm is used throughout herein, it should be noted that other norms could be used.

It should also be noted that although the embodiments disclosed herein above were obtained by minimizing a function of the cyclic differences subject to periodic renormalization, other constraints are possible which would result in other embodiments. Renormalization is equivalent to the constraint $\|w\|=1$. Other examples of constraints, but not limited to, are $\|c\|=1$, or $w_l=1$ for some $l \in \{0, \ldots, L_w\}$, or $\|[c_\Delta, \ldots, c_{\Delta+\nu}]^T\|=1$.

Although one embodiment of the equalizer of this invention, the transversal filter equalizer, was detailed herein above, it should be noted that the equalizer of this invention is not limited to that embodiment and the various other embodiments known in the art are within the scope of this invention.

Although the invention has been described with respect to various embodiments, it should be realized this invention is also capable of a wide variety of further and other embodiments within the spirit and scope of the appended claims.

What is claimed is:

1. An adaptive method for equalizing input data, the method comprising the steps of:

utilizing cyclic differences of equalized data to define a function of the input data and a plurality of equalizer characteristic parameters, a cyclic difference being a difference between equalized data at a location corresponding to a sum of a length of a cyclic prefix length and a predetermined increment and equalized data at a location corresponding to a sum of the cyclic prefix length, the predetermined increment and a predetermined block size;

minimizing the function;

obtaining from said minimization and from an initial value for each of said plurality of equalizer characteristic parameters an updated value for each one of said plurality of equalizer characteristic parameters; and processing the input data, utilizing said plurality of equalizer characteristic parameters, in order to provide time domain equalization/channel shortening.

2. The method of claim 1 wherein the step of minimizing said function comprises the step of:

minimizing said function subject to a constraint.

3. An adaptive method for equalizing input data, the method comprising the steps of:

utilizing cyclic differences of equalized data to define a function of the input data and a plurality of equalizer characteristic parameters minimizing the function;

obtaining from said minimization and from an initial value for each of said plurality of equalizer characteristic parameters an updated value for each one of said plurality of equalizer characteristic parameters; and processing the input data, utilizing said plurality of equalizer characteristic parameters, in order to provide equalization;

wherein the step of minimizing said function comprises the steps of minimizing said function subject to a constraint; and minimizing a sum of expectations of a magnitude squared of a cyclic difference from a plurality of cyclic differences, each one cyclic difference from said plurality of cyclic differences corresponding to a cyclic index from a plurality of cyclic indices.

4. The method of claim 2 wherein the step of minimizing said function further comprises the step of minimizing an expectation of a magnitude squared of a cyclic difference.

5. A receiver comprising:

a time domain equalizer/channel shortener capable of receiving data and processing the data in order to generate equalized data, said time domain equalizer/channel shortener including a plurality of equalizer characteristic parameters, a value for each one of said plurality of equalizer characteristic parameters being obtained by a minimization of a function of the data and said plurality of equalizer characteristic parameters; said function being defined by cyclic differences of the equalized data; a cyclic difference being a difference between equalized data at a location corresponding to a sum of a length of a cyclic prefix length and a predetermined increment and equalized data at a location corresponding to a sum of the cyclic prefix length, the predetermined increment and a redetermined block size; and a demodulator capable of receiving the equalized data from said equalizer.

6. A receiver comprising:

an equalizer capable of receiving data and processing the data in order to generate equalized data, said equalizer including a plurality of equalizer characteristic parameters, a value for each one of said plurality of equalizer characteristic parameters being obtained by a minimization of a function of the data and said plurality of equalizer characteristic parameters; said function being defined by cyclic differences of the equalized data; and a demodulator capable of receiving the equalized data from said equalizer, wherein:

said function comprises a sum of expectations of a magnitude squared of a cyclic difference from a plurality of cyclic differences, each one cyclic difference from said plurality of cyclic differences corresponding to a cyclic index from a plurality of cyclic indices;

said value being an updated value; and said updated value for each one of said plurality of equalizer characteristic parameters being obtained from said minimization and from a plurality of initial values.

7. A receiver comprising:

an equalizer capable of receiving data and processing the data in order to generate equalized data, said equalizer including a plurality of equalizer characteristic parameters, a value for each one of said plurality of equalizer characteristic parameters being obtained by a minimization of a function of the data and said plurality of equalizer characteristic parameters; said function being defined by cyclic differences of the equalized data; and a demodulator capable of receiving the equalized data from said equalizer, wherein:

said function comprises an expectation of a magnitude squared of a cyclic difference;

said value being an updated value; and said updated value for each one of said plurality of equalizer characteristic parameters being obtained from said minimization and from a plurality of initial values.

8. A receiver comprising:

a time domain equalizer/channel shortener capable of receiving data and processing said data in order to generate equalized data, said time domain equalizer/channel shortener including a plurality of equalizer characteristic parameters;

a demodulator capable of receiving the equalized data from said equalizer;

at least one processor;

at least one computer readable medium, having computer readable code embodied therein, said code capable of causing the at least one processor to:

minimize a function of the received data and said plurality of equalizer characteristic parameters, said function utilizing cyclic differences of equalized data; a cyclic difference being a difference between equalized data at a location corresponding to a sum of a length of a cyclic prefix length and a predetermined increment and equalized data at a location corresponding to a sum of the cyclic prefix length, the predetermined increment and a predetermined block size obtain from said minimization and from a plurality of initial values an updated value for each one of said plurality of equalizer characteristic parameters; and provide said updated value for each one of said plurality of equalizer characteristic parameters to said time domain equalizer/channel shortener.

9. The receiver of claim 8 wherein said code in causing the at least one processor to minimize said function further causes the at least one processor to:

minimize said function subject to a constraint.

10. A receiver comprising:

an equalizer capable of receiving data and processing said data in order to generate equalized data, said equalizer including a plurality of equalizer characteristic parameters;

a demodulator capable of receiving the equalized data from said equalizer;

at least one processor;

at least one computer readable medium, having computer readable code embodied therein, said code capable of causing the at least one processor to:

minimize a function of the received data and said plurality of equalizer characteristic parameters subject to a constraint, said function utilizing cyclic differences of equalized data;

obtain from said minimization and from a plurality of initial values an updated value for each one of said plurality of equalizer characteristic parameters; and provide said updated value for each one of said plurality of equalizer characteristic parameters to said equalizer;

wherein said function comprises a sum of expectations of a magnitude squared of a cyclic difference from a plurality of cyclic differences, each one cyclic difference from said plurality of cyclic differences corresponding to a cyclic index from a plurality of cyclic indices.

11. A receiver comprising:

an equalizer capable of receiving data and processing said data in order to generate equalized data, said equalizer including a plurality of equalizer characteristic parameters;

a demodulator capable of receiving the equalized data from said equalizer;

at least one processor;

at least one computer readable medium, having computer readable code embodied therein, said code capable of causing the at least one processor to:

minimize a function of the received data and said plurality of equalizer characteristic parameters subject to a constraint, said function utilizing cyclic differences of equalized data;

obtain from said minimization and from a plurality of initial values an updated value for each one of said plurality of equalizer characteristic parameters; and provide said updated value for each one of said plurality of equalizer characteristic parameters to said equalizer;

wherein said function comprises an expectation of a magnitude squared of a cyclic difference.

12. A time domain equalizer/channel shortener comprising:

a plurality of equalizer characteristic parameters;

a value for each one of said plurality of equalizer characteristic parameters being updated from an initial value from a plurality of initial values by minimization of a function of equalizer input data and said plurality of equalizer characteristic parameters;

said function comprising cyclic differences of equalized data; a cyclic difference being a difference between equalized data at a location corresponding to a sum of a length of a cyclic prefix length and a predetermined increment and equalized data at a location corresponding to a sum of the cyclic prefix length the predetermined increment and a predetermined block size.

13. The equalizer of claim 12 wherein said value for each one of said plurality of equalizer characteristic parameters is updated by a minimization of said function subject to a constraint.

14. The equalizer of claim 12 further comprising:
a plurality of delay elements, each one delay element from said plurality of delay elements delaying a datum from received data by a predetermined delay;
a plurality of multi plying elements, each one multiplying element from said plurality of multiplying elements multiplying an output of one delay element from said plurality of delay elements by one weight value from a plurality of weight values;
a summing element capable of receiving an output from each said multiplying element from said plurality of multiplying elements;
and wherein said plurality of equalizer characteristic parameters includes said plurality of weight values.

15. The equalizer of claim 14 further comprising:
means for providing one updated weight value from said plurality of weight values to each one multiplying element from said plurality of multiplying elements.

16. An equalizer comprising:
a plurality of equalizer characteristic parameters;
a value for each one of said plurality of equalizer characteristic parameters being updated from an initial value from a plurality of initial values by minimization of a function of equalizer input data and said plurality of equalizer characteristic parameters subject to a constraint;

said function comprising cyclic differences of equalized data;a cyclic difference being a difference between equalized data at a location corresponding to a sum of a length of a cyclic prefix length and a predetermined increment and equalized data at a location corresponding to a sum of the cyclic prefix length,the predetermined increment and a predetermined block size wherein said function comprises a sum of expectations of a magnitude squared of a cyclic difference from a plurality of cyclic differences, each one cyclic difference from said plurality of cyclic differences corresponding to a cyclic index from a plurality of cyclic indices.

17. An equalizer comprising:
a plurality of equalizer characteristic parameters;
a value for each one of said plurality of equalizer characteristic parameters being updated from an initial value from a plurality of initial values by minimization of a function of equalizer input data and said plurality of equalizer characteristic parameters subject to a constraint;
said function comprising cyclic differences of equalized data;
wherein said function comprises an expectation of a magnitude squared of a cyclic difference.

* * * * *

UNITED STATES PATENT AND TRADEMARK OFFICE
CERTIFICATE OF CORRECTION

PATENT NO. : 7,230,984 B2
APPLICATION NO. : 10/390390
DATED : June 12, 2007
INVENTOR(S) : Richard K. Martin et al.

It is certified that error appears in the above-identified patent and that said Letters Patent is hereby corrected as shown below:

In the title page, under (75) Inventors, "Jaiganesh Balakrishnan, Dallas, TX (US)" should read -- Jaiganesh Balakrishnan, Dallas, TX (IN) --

In the title page, under (75) Inventors, " Wonzoo Chung, Ithaca, NY (US)" should read -- Wonzoo Chung, Ithaca, NY (KR) --.

In column 10, line 33, "characteristic parameters" should read -- characteristic parameters; --

In column 10, line 43, "the steps of" should read -- the steps of: --

In column 10, line 51, "the step of" should read -- the step of: --

In column 11, line 2, "a redetermined block" should read -- a predetermined block --

In column 11, line 67, "block size" should read -- block size; --

In column 13, line 9, "length the predetermined" should read -- length, the predetermined --

In column 13, line 19, "multi plying elements" should read -- multiplying elements --

In column 14, line 14, "block size" should read -- block size; --

Signed and Sealed this

Thirty-first Day of July, 2007

JON W. DUDAS
*Director of the United States Patent and Trademark Office*